US006940075B2

(12) United States Patent
Schulz

(10) Patent No.: US 6,940,075 B2
(45) Date of Patent: Sep. 6, 2005

(54) ULTRAVIOLET-LIGHT-BASED DISINFECTION REACTOR

(76) Inventor: Christopher R. Schulz, 20795 E. Fair Pl., Aurora, CO (US) 80016

( * ) Notice: Subject to any disclaimer, the term of this patent is extended or adjusted under 35 U.S.C. 154(b) by 136 days.

(21) Appl. No.: 10/625,835

(22) Filed: Jul. 23, 2003

(65) Prior Publication Data

US 2005/0023482 A1 Feb. 3, 2005

Related U.S. Application Data

(63) Continuation-in-part of application No. 09/805,799, filed on Mar. 15, 2001, now abandoned.

(51) Int. Cl.[7] .................................................. B01J 19/12

(52) U.S. Cl. ................... 250/432 R; 210/748; 210/150; 422/186.3

(58) Field of Search ...................... 250/432 R; 210/748, 210/150; 422/186.3

*Primary Examiner*—John R. Lee
*Assistant Examiner*—Zia R. Hashmi
(74) *Attorney, Agent, or Firm*—Alfred J. Mangels

(57) ABSTRACT

A disinfection reactor for disinfecting liquid, such as water from a water filtration plant, by exposing the liquid to ultraviolet light. The reactor includes a generally rectangular reactor vessel and two or more medium pressure ultraviolet lamps that extend within the reactor vessel in a direction transverse to the direction of liquid flow therethrough. The reactor vessel includes liquid guide surfaces that guide liquid to flow in a converging flow path having a reduced-area flow region in the vicinity of the ultraviolet lamps. The ultraviolet lamps are positioned spaced from and between the guide surfaces.

49 Claims, 10 Drawing Sheets

ULTRAVIOLET-LIGHT-BASED DISINFECTION REACTOR

CROSS-REFERENCE TO RELATED APPLICATION

The present application is a continuation-in-part of application Ser. No. 09/805,799, filed Mar. 15, 2001, now abandoned, the entire disclosure of which is hereby incorporated herein by reference.

BACKGROUND OF THE INVENTION

1. Field of the Invention

The present invention relates to disinfection apparatus for use in connection with water treatment plants and involves the use of ultraviolet light for inactivating microorganisms. More particularly, the present invention relates to an improved ultraviolet-light-based disinfection reactor for treating water and that utilizes medium pressure ultraviolet lamps for microorganism treatment, either alone or as supplemented by a chemical oxidation treatment that can be included within the apparatus.

2. Description of the Related Art

Ultraviolet-light-based apparatus for disinfecting water by subjecting the water to ultraviolet light to inactivate microorganisms has been known for some time. Recently, several different forms of ultraviolet-based apparatus have been disclosed for the purpose of providing improved disinfection performance. Among those devices is one disclosed in U.S. Pat. No. 6,015,229, entitled "Method And Apparatus For Improved Mixing In Fluids," which issued in Jan. 18, 2000, to Cormack et al. The Cormack et al. '229 patent discloses an array of tubular ultraviolet lamps that have their axes aligned with the flow direction to provide channels therebetween through which the fluid to be treated flows. Adjacent the upstream ends of the lamps are mixing devices in the form of triangular elements that create counter-rotating vortices that promote turbulent mixing of the fluid to increase the exposure time of the fluid to the ultraviolet light. However, the structure disclosed in the Cormack et al. '229 patent requires a lengthy treatment system, because of the alignment of the tubular lamps with the flow, that limits the adaptability of that arrangement as a retrofit for existing treatment plants, and it also utilizes a large number of ultraviolet lamps, which increases both the initial cost as well as the operating costs for such a system.

Other prior art arrangements orient the tubular lamps so that their axes are disposed perpendicular to the flow direction. Such arrangements are disclosed in U.S. Pat. No. 5,200,156, entitled "Device for Irradiating Flowing Liquids and/or Gases with UV Light," which issued on Apr. 6, 1993, to Wedekamp, and U.S. Pat. No. 5,503,800, entitled "Ultra-Violet Sterilizing System for Waste Water," which issued on Apr. 2, 1996, to Free. However, the Wedekamp '156 arrangement utilizes lamps that have a substantially rectangular cross section, with at least one pair of parallel sides, within either a constant cross-sectional area flow channel, or a flow channel that includes a diverging inlet section that defines an inlet diffuser, followed by a constant area center housing portion containing the lamps, and a converging outlet section. That arrangement also involves a lengthy treatment system that is difficult to incorporate as a retrofit for an existing water treatment system.

The Free '800 patent shows an arrangement in which elongate wall members are positioned on opposite sides of tubular lamps to define uniform width flow channels in which projections are provided on the wall members to induce turbulence of the liquid as it passes around the lamps. The Free '800 apparatus is intended for use in waste water treatment systems, in which the transmittance of the water is of the order of only about 20%, and thus especially narrow confinement of the untreated water about the lamp tubes is necessary, thereby reducing the effective flow throughput in such arrangements.

It is therefore desirable to provide an ultraviolet-light-based disinfection reactor that is of a more compact size and that is therefore adaptable for retrofitting into existing water treatment systems.

SUMMARY OF THE INVENTION

Briefly stated, in accordance with one aspect of the present invention, a disinfection reactor vessel is provided for disinfecting liquids by exposing the liquid to ultraviolet light. The reactor vessel includes an enclosure, a liquid inlet for receiving liquid to be treated, and a liquid outlet through which the treated liquid passes. At least two spaced, tubular ultraviolet lamps are positioned between the liquid inlet and the liquid outlet and have their respective longitudinal axes positioned substantially transversely relative to the direction of liquid flow through the flow channel. A plurality of liquid guide surfaces are positioned within the reactor vessel for guiding liquid to flow over the at least two ultraviolet lamps for exposure of the liquid to ultraviolet light. The guide surfaces define at least one converging flow section upstream of the ultraviolet lamps, so that liquid flowing through the reactor vessel traverses a converging, turbulent flow pathway to bring microorganisms in the liquid closer to the ultraviolet lamps for enhanced disinfection.

In accordance with another aspect of the present invention the guide surfaces are convexly-curved and are spaced from and opposed to each other to define a flow channel therebetween, wherein the flow channel includes a reduced-area throat section. At least one ultraviolet lamp is disposed upstream of the reduced-area throat and at least one ultraviolet lamp is disposed downstream of the throat. Liquid flowing through the flow channel passes over and around each of the ultraviolet lamps to expose the liquid to ultraviolet light to thereby inactivate microorganisms to disinfect liquid that flows through the flow channel.

In accordance with a further aspect of the present invention the disinfection reactor includes a plurality of interiorly-positioned flow deflectors that divide the incoming flow stream to flow in plural, turbulent converging flow paths.

DESCRIPTION OF THE PREFERRED EMBODIMENTS

Figures 1, 2:
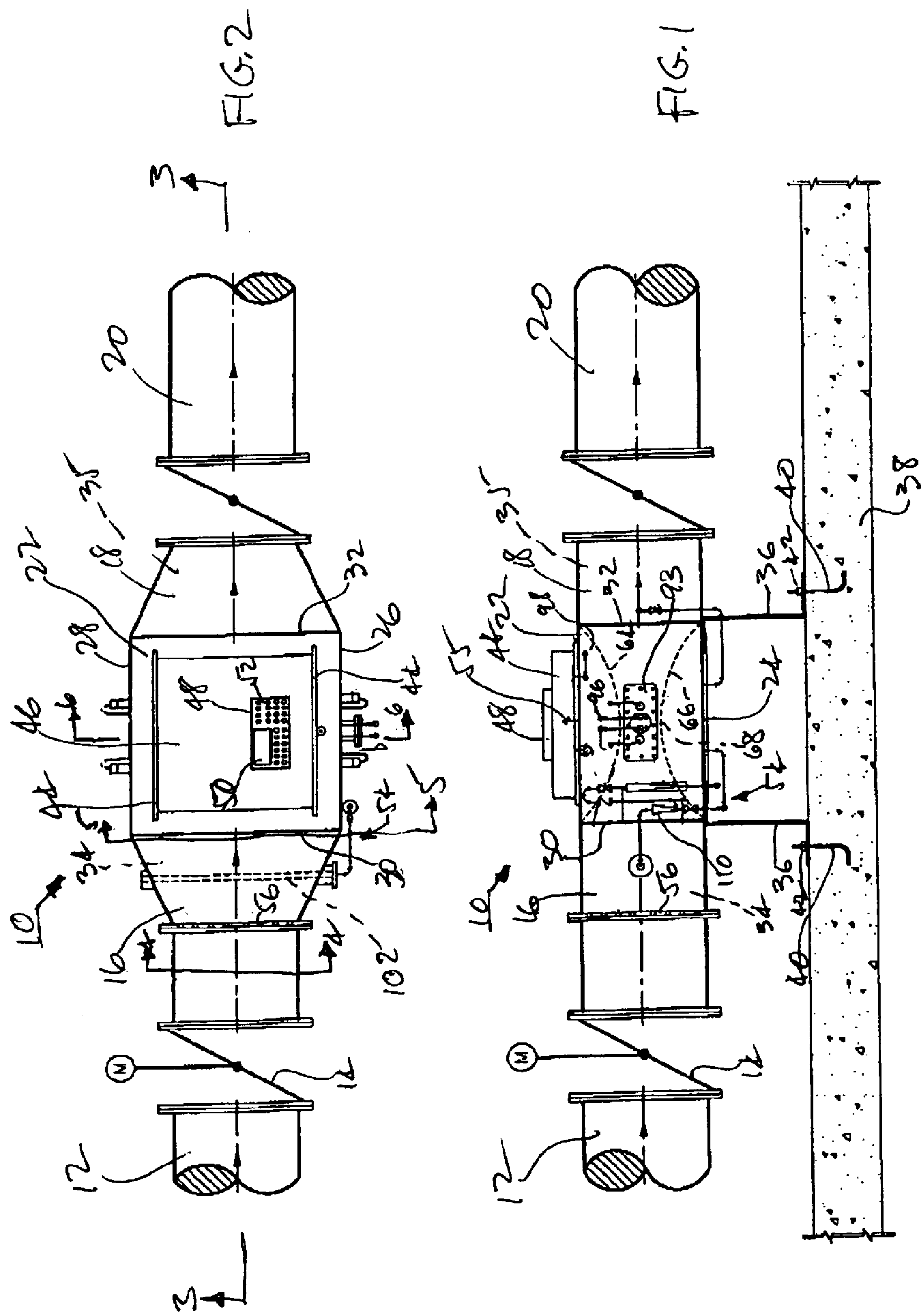
FIG. 1 is a side elevational view showing a disinfection reactor vessel in accordance with the present invention installed in a pipeline of a water treatment system.
FIG. 2 is a top plan view of the disinfection reactor vessel and pipeline shown in FIG. 1.
Figure 3:
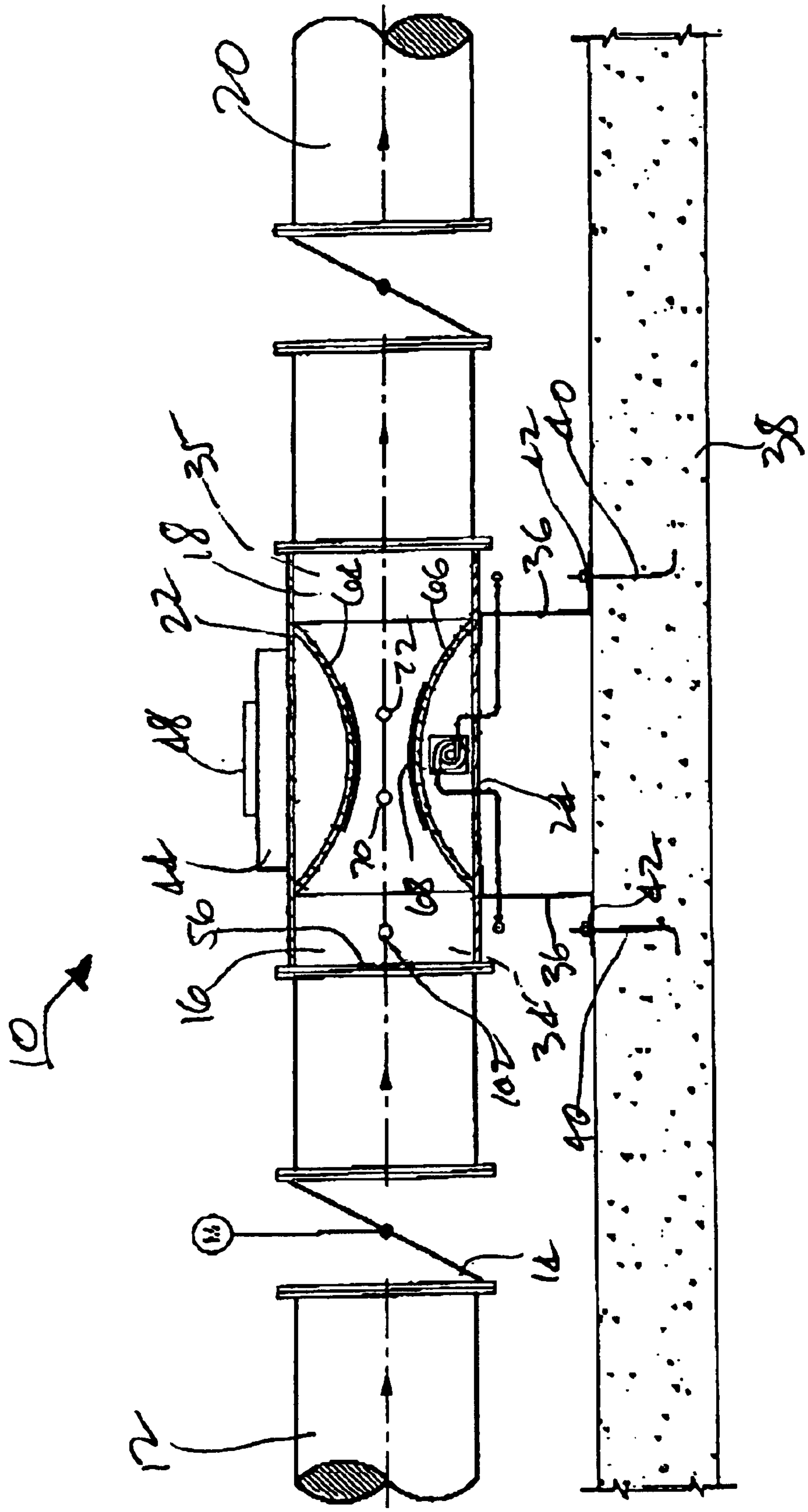
FIG. 3 is a side elevational view similar to FIG. 1, partially in cross section, taken along the line 3—3 of FIG. 2 to show the form of the flow channel.

Referring now to the drawings, and particularly to FIGS. 1, 2, and 3 thereof, there is shown a disinfection reactor vessel 10 positioned in a pipeline 12 that would typically be located in a filter pipe gallery of a water treatment plant (not shown). For example, pipeline 12 can carry water that flows from the outlet of a gravity water filter in a water treatment plant. Pipeline 12 can have the same diameter as the filter outlet opening, which typically ranges from 6 to 36 inches, depending upon the design flow rate, and, as shown, it can include a motor-operated butterfly valve 14 for controlling the rate of flow within pipeline 12, and thereby also the rate of flow of water into and through reactor vessel 10.

Pipeline 12 from the water treatment plant is connected with a reactor-vessel inlet conduit 16 by a flanged connection, or the like. A reactor-vessel outlet conduit 18 carries away treated water that has passed through the disinfection reactor vessel and that has been sufficiently treated to reduce the level of microorganisms to a desired level. Outlet conduit 18 is connected with a downstream pipeline 20 that conveys the treated water to another treatment unit, a clearwell, or a pumping station.

Reactor vessel 10 is a substantially rectangular, liquid-tight enclosure and it is defined by a pair of opposed, substantially parallel top and bottom walls 22, 24, a pair of opposed, substantially parallel right and left side walls 26, 28, and a pair of opposed, substantially parallel front and rear walls 30, 32. As shown, the respective walls of reactor vessel 10 are disposed so that side walls 26, 28 are spaced from each other a distance greater than the inlet diameter of inlet conduit 16, while top and bottom walls 22, 24 are spaced from each other a distance that corresponds with the diameter of the inlet of inlet conduit 16. Accordingly, the structure of reactor vessel 10 in relation to inlet conduit 16 is such as to provide a larger cross-sectional flow area within reactor vessel 10, as compared with the cross-sectional flow area at the inlet of inlet conduit 16, which defines an inlet diffusion zone 34 within inlet conduit 16 as a result of the cross-sectional area difference between the interior of reactor vessel 10 and the inlet of inlet conduit 16. Inlet conduit 16 is a transition member that in the flow direction changes in cross-sectional shape from circular to rectangular, and that simultaneously increases in cross-sectional area in the flow direction, to thereby gradually decrease the velocity of the incoming flow stream as it enters reactor vessel 10, to improve the uniformity of the flow distribution across the reactor vessel cross-sectional area.

Reactor outlet conduit 18 is also a transition member. However, it changes in cross-sectional shape along the flow direction from a rectangular shape to a circular shape. Accordingly, reactor outlet conduit 18 provides a converging outlet mixing zone 35 as the flow proceeds toward outlet pipeline 20.

Reactor vessel 10 is supported by four reactor support legs 36 that each have a Z-cross-section and that are bolted to the filter gallery concrete floor 38 by means of anchor bolts 40 that are retained within floor 38. Anchor bolts 40 extend outwardly from the floor, through an aperture provided in a lower horizontal plate element forming part of support leg 36, to receive respective retaining nuts 42 to retain legs 36 in position against floor 38. The corresponding upper horizontal plate elements of Z-shaped support legs 36 can be welded to vessel bottom wall 24. If desired, a small, concrete pad can be poured underneath reactor vessel 10 so that standard support legs can be used for filter gallery floors that are several feet below the centerline of the pipe.

As best seen in FIG. 2, carried on top wall 22 of reactor vessel 10 are a pair of spaced control panel support brackets 44 that can extend parallel to the direction of water flow, if desired, and that enclose and support a reactor vessel control panel 46. Control panel 46 can house ultraviolet lamp ballasts and igniters, and it can include an operator interface 48 that includes a digital display panel 50 for displaying operational parameters of the system and an alpha-numeric keypad 52 for inputting information and control parameters. Operating parameters can include the operational status of the reactor system, whether normal or requiring maintenance, individual ultraviolet lamp status, operating hours for the system since a previous maintenance period, water flow rate, and the like. Optionally, a programmable logic controller (not shown) can be provided to integrate the operation of the disinfection reactor system with the operation of the associated gravity filter for automatic coordination of the systems.

Positioned adjacent sidewall 26 of reactor vessel 10 is a chemical oxidation system 54 for introducing a chemical oxidant, such as hydrogen peroxide, as will be explained hereinafter. The chemical oxidation system can also be utilized for introducing a cleaning agent for cleaning protective sleeves that surround ultraviolet lamps that are positioned within reactor vessel 10. Additionally, an outlet tap 55 can be provided to convey treated water to a chemical actinometer monitoring system for accurately determining the ultraviolet radiation dose that is applied to the water being treated. The actinometer can monitor operation of the ultraviolet lamps within the reactor vessel, including enabling an assessment of the degradation of the intensity of the ultraviolet light over time to determine whether cleaning of the sleeves surrounding the ultraviolet lamps is needed.

An inlet baffle plate 56 is positioned at the inlet of reactor inlet conduit 16. Inlet baffle plate 56 extends completely across inlet conduit 16 and is positioned so it is substantially perpendicular to the entering flow stream. A plurality of perforations 58 (see FIG. 4) extend through inlet baffle plate 56 and are substantially uniformly distributed over the entire area thereof to provide a substantially uniform radial distribution of the flow of water across the interior flow area within reactor vessel 10, as well as to induce turbulence in the water that enters vessel 10. Preferably, the ratio of the open area defined by apertures 58 to the total area of inlet baffle plate 56 is selected to introduce a controlling pressure drop across plate 56 of about 3 inches of water at the design flow rate.

Referring once again to FIG. 3, positioned within reactor vessel 10 and between reactor inlet conduit 16 and reactor outlet conduit 18 are a pair of upper and lower curved guide surfaces 64, 66. Each of guide surfaces 64, 66 extends completely across the interior of reactor vessel 10 between side panels 26 and 28 and each guide surface is an imperforate member that serves to confine the flow of liquid that passes through inlet conduit 16 and directs it inwardly toward the center of vessel 10. Guide surfaces 64, 66 are bowed to define U-shaped elements, and their convex surfaces face each other and are spaced from each other to define a reduced area throat section 68 in the form of a substantially rectangular flow cross section that is positioned substantially centrally within reactor vessel 10. Also as shown in FIG. 3, the upstream and downstream ends of upper guide surface 64 are connected at two spaced points with reactor vessel top wall 22, and the upstream and downstream ends of lower guide surface 66 are connected at two spaced points with reactor vessel bottom wall 24. Because each of upper and lower guide surfaces 64, 66 extends completely across the reactor vessel interior, the flow path of the water as it passes from inlet baffle plate 56 toward outlet baffle plate 60 is initially a converging passageway of rectangular cross-section, with the cross-sectional area diminishing to a minimum at reduced area throat section 68, whereupon the flow area increases toward outlet baffle plate 60. Accordingly, the flow passageway within the interior of reactor vessel 10 changes in the flow direction from a converging zone, to a throat zone, and to a diverging zone. In that regard, the curvature of upper and lower guide surfaces can be parabolic, hyperbolic, or the like, but preferably it is a relatively smooth curve.

Figure 4:
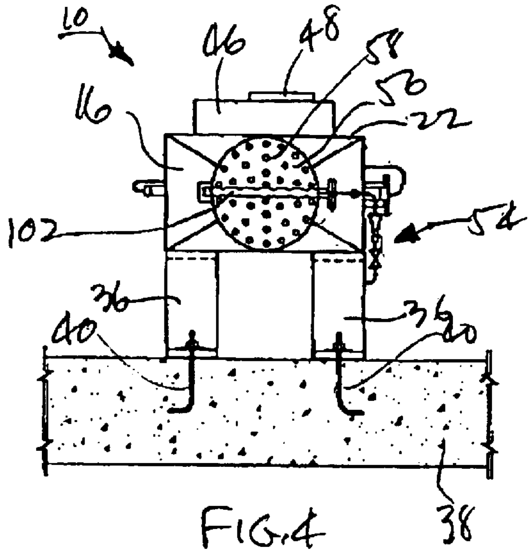
FIG. 4 is a cross-sectional view taken along the line 4—4 of FIG. 2.

FIG. 4 is a view looking in the direction of the water flow within pipeline 12 at a point immediately upstream of the inlet to reactor inlet conduit 16. The incoming water flows against perforated inlet baffle plate 56 and into inlet conduit

Figure 5:
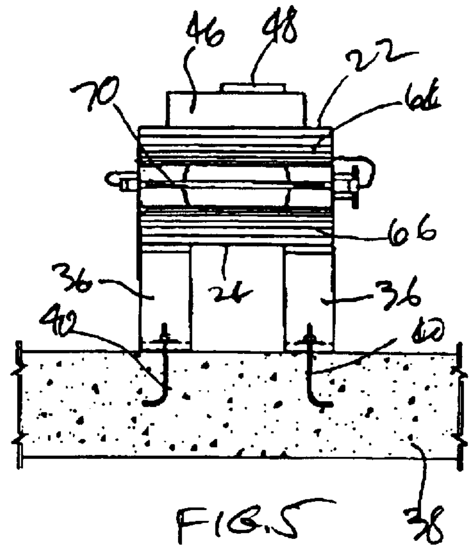
FIG. 5 is a cross-sectional view taken along the line 5—5 of FIG. 2.
Figure 6:
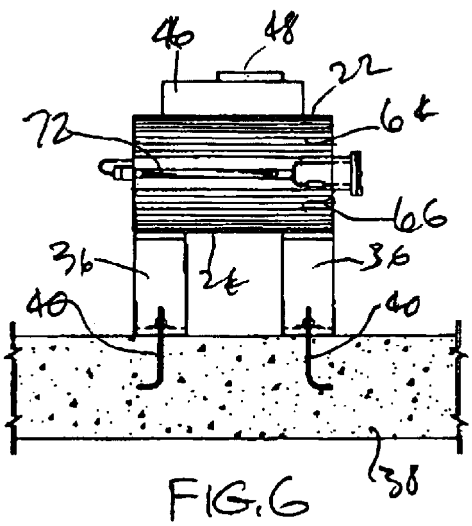
FIG. 6 is a cross-sectional view taken along the line 6—6 of FIG. 2.

16. After the water enters inlet diffusion zone 34 it flows into the converging zone of the flow passageway, which is defined by the upstream portions of upper and lower guide surfaces 64, 66, which are visible in the cross-sectional view shown in FIG. 5, taken at a point downstream of inlet baffle plate 56. Similarly, FIG. 6 is a cross-sectional view through the flow channel taken at a point immediately upstream of reduced area throat section 68.

As also seen in FIG. 3, reactor vessel 10 includes a pair of interiorly-positioned, transversely-extending, substantially parallel ultraviolet light sources 70, 72 that are of tubular form. The light sources extend completely across the reactor vessel between sidewalls 26, 28 and are positioned substantially centrally within and across the water flow path so that their axes intersect the longitudinal axis of the flow path of the water as it passes from reactor inlet conduit 16 to reactor outlet conduit 18. Ultraviolet lamp 70 is positioned on the upstream side of reduced area throat portion 68 and ultraviolet lamp 72 is positioned downstream of reduced area throat portion 68. Consequently, water that passes through inlet baffle 56 as a turbulent flow is confined between opposed upper and lower guide surfaces 64, 66 to flow around and past upstream ultraviolet lamp 70, after which it passes through reduced area throat section 68 and then passes around downstream ultraviolet lamp 72. By confining the water flow and directing it to and around the ultraviolet lamps, the water is brought close to the source of the light flux emitted from ultraviolet lamps 70, 72, and any microorganisms that are present within the water are exposed to high intensity ultraviolet light to inactivate them.

Figure 8:
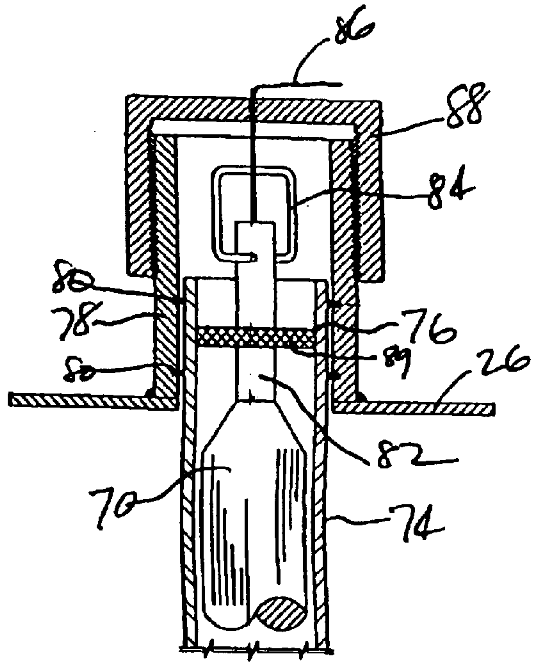
FIG. 8 is an enlarged, fragmentary, cross-sectional view showing one form of mounting and sealing arrangement at an end of an ultraviolet lamp and lamp sleeve and the reactor vessel sidewall.

FIG. 8 shows one form of structural arrangement for supporting the ends of the ultraviolet lamps in the sidewalls of reactor vessel 10. Each of ultraviolet lamps 70, 72 is an elongated, tubular lamp that is positioned so that it extends across the entire width of reactor vessel 10 between sidewalls 26 and 28. Lamps 70, 72 are each contained within a respective tubular quartz sleeve, only one of which, sleeve 74, is shown in FIG. 8. The quartz sleeves enclose and protect the ultraviolet lamps, while allowing ultraviolet light emitted by the lamps to readily pass therethrough. As with lamps 70, 72 themselves, the tubular quartz sleeves also have a length that is greater than the spacing between sidewalls 26 and 28, so that outer end portions 76 of each of the sleeves extends outwardly beyond sidewall 26 and into an annular collar 78 that is securely connected with reactor sidewall 26, such as by welding. A pair of longitudinally-spaced O-rings 80 are provided between sleeve end portion 76 and collar 78 to effect a double seal between the quartz tube and the collar, to thereby prevent the passage of water into the lamp end housing defined by collar 78. The ends of the lamps include a reduced diameter ceramic end connector 82 that carries a pull handle 84 for allowing lamp 70 to be conveniently axially removed from quartz sleeve 74 for replacement purposes. A lamp wire 86 extends outwardly from ceramic end connector 82 and passes through a threaded end cap 88 that fits over the outermost end of collar 78 and engages with an external thread formed thereon. Additionally, an annular centralizer ring 89, which can be a Teflon ring, is provided to engage end connector 82 and to centrally position lamp 70 within sleeve 74. Although shown in FIG. 8 in connection with one end of lamp 70, the structural arrangement shown is typical for both outer ends of each of lamps 70, 72 and their associated quartz sleeves. Moreover, the connection arrangement shown is merely illustrative, and other forms of connection arrangements can be utilized, if desired, as will be appreciated by those skilled in the art.

The ultraviolet lamps that are provided in the reactor vessel in accordance with the present invention preferably are medium pressure lamps that have an ultraviolet light output in the germicidal range (230 nm to 300 nm) and at an intensity level that is approximately 50 to 100 times higher than the ultraviolet light output from low-pressure ultraviolet lamps. Lamps of the preferred type can be obtained from Heraeus Amersil, Inc., Noblelight Division, Duluth, Ga., under the designations Type EC and Type QC, each of which provides increased output in the ultraviolet C range. The Heraeus medium pressure lamps are available in lengths ranging from 100 mm to 1,500 mm, and at power ranges from 1 kW to 15 kW.

For maximum operating efficiency of the reactor in the inactivation of microorganisms, it is preferred that the flow stream be exposed to the maximum available ultraviolet radiation. Accordingly, those interior surfaces within the reactor vessel that confine the water as it flows between inlet conduit 16 and outlet conduit 18 can be provided in the form of highly polished surfaces, to reflect back into the flow stream ultraviolet radiation that impinges on the walls that define the flow channel between the ultraviolet lamps. In that regard, stainless steel has a reflectance of only about 20%, which consequently can result in the dissipation of considerable ultraviolet radiation that could otherwise be utilized for disinfection purposes. But highly polished aluminum surfaces have a reflectance of about 90%. It is desirable and preferred that at least those areas of upper and lower liquid guide surfaces 64, 66 that extend between and are opposite lamps 70, 72 have highly reflective surfaces, such as those that can be provided by a highly polished aluminum sheet. In addition to polished aluminum sheets, other materials having a surface that provides a high reflectance value to ultraviolet light of about 90% can also be utilized.

Figure 7:
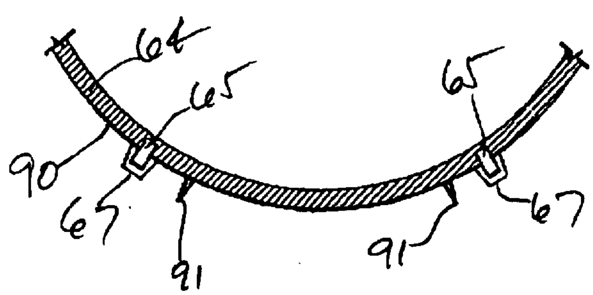
FIG. 7 is an enlarged, fragmentary cross-sectional view of a portion of a water flow guide surface of the reactor vessel of FIG. 1.

Referring to FIG. 7, there is shown an arrangement whereby upper guide surface 64 includes an overlying, highly reflective surface. In the embodiment shown, the reflective surface is a polished aluminum reflector sheet 90 that has its polished surface facing inwardly, toward the flow passageway, to provide increased reflectance back into the fluid stream of ultraviolet light emitted by the lamps, to thereby increase the treatment effectiveness of the reactor. Reflector sheet 90 can be retained in position by a suitable coupling arrangement, such as threaded studs or bolts 65 that extend through similarly-sized and spaced threaded holes in reflector sheet 90 and with which threaded caps 67 engage to hold sheet 90 against guide surface 64. A similar arrangement can be provided for securing an aluminum sheet to the inwardly-facing surface of lower guide surface 66. Further, other forms of comparably highly reflective surfaces can be provided, if desired.

In addition to having polished surfaces facing the flow stream, each of reflector sheets 90 can also include deflector vanes on their surfaces that face into the interior of reactor vessel 10. As shown in FIG. 7, sheet 90 carries a pair of laterally-extending deflector vanes 91, one positioned on the upstream-facing part of sheet 90 and the other positioned on the downstream-facing part. Deflector vanes 91 extend transversely relative to the flow direction, such as perpendicularly, and they can extend into the flow stream a distance of from about ¼ inch to about ½ inch or so, to deflect the boundary layer of the flow stream inwardly toward the ultraviolet lamps. By providing such deflector vanes, the boundary layer, which is that portion of the flow stream that is most distant from the ultraviolet lamps, is redirected toward the ultraviolet lamps, to bring it closer to the source of ultraviolet radiation and thereby further enhance the disinfection efficiency of the present reactor design. The deflector vanes can be separate elements, such as angle members that extend transversely across the direction of flow and that are suitably attached to the reflector sheets, such as by bolts, by welding, or the like. Alternatively, the deflector vanes can be integrally formed in the reflector sheets, such as by crimping the sheets at the appropriate locations.

When the reflective surfaces are provided in the form of aluminum sheets, the aluminum surfaces are preferably coated with a protective coating to minimize corrosion. Once such suitable protective coating is a nylon-based polymer resin that is sold under the trade name NYALIC, and which is available from Hawkins-Bricker International, Inc., of Doraville, Ga. The NYALIC material is a crystal-clear polymer resin that is highly resistant to chemical and ultraviolet attack at a coating thickness as low as about 0.5 mil. Of course, other suitable protective coating materials can be utilized, as will be appreciated by those skilled in the art.

Access to the interior of the reactor vessel to enable the inspection and any necessary replacement of the deflector sheets can be provided by a removable access plate 93 shown in FIG. 1. Access plate 93 can be configured to extend into the access opening so that its innermost surface is substantially flush with the interior surface of reactor vessel 10, and it preferably includes a suitable peripheral sealing gasket and sufficient connecting bolts to provide a leak-tight connection between access plate 93 and reactor vessel front wall 26.

Because of the converging-diverging form of the water flow passageway within reactor vessel 10, the present flow path design readily lends itself to a flow measurement system. Referring once again to FIG. 1, a first pressure tap 96 can be provided that communicates with reduced area throat 68 of the flow passageway, and a second pressure tap 98 can be provided at a downstream point, or at an upstream point if desired. The pressures sensed at pressure taps 96, 98 can be provided to a known form of differential pressure transmitter (not shown) that can be used to sense the pressure drop across the throat of the reactor flow path and to convert that pressure drop to a flow measurement that can be displayed to an operator. If desired, a flow signal provided by differential pressure transmitter 100 can be utilized to adjust a rate-of-flow control valve, such as valve 14, in order to maintain a substantially constant flow rate through reactor vessel 10.

Figure 9:
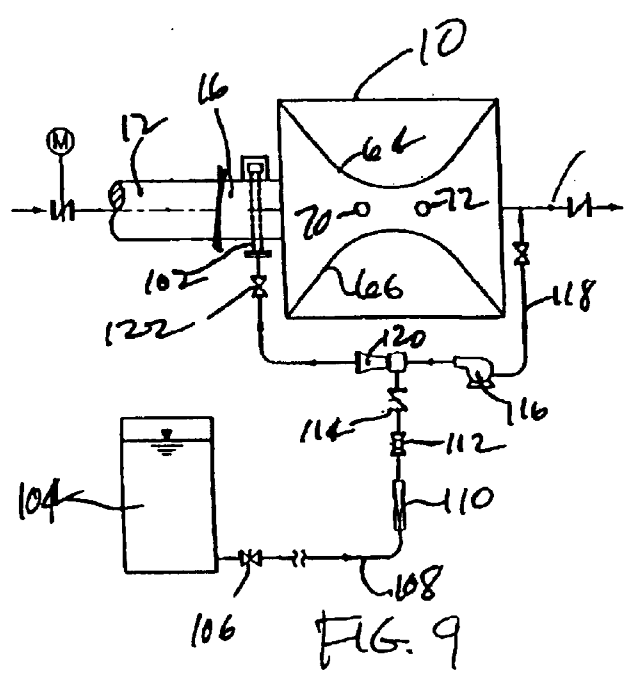
FIG. 9 is a schematic view showing one form of liquid feed system positioned upstream of the reactor vessel for introducing a chemical oxidant or a cleaning solution.

In addition to the disinfection provided by the ultraviolet light sources within reactor vessel 10, additional disinfection can be achieved by the injection into the water flow stream of a chemical oxidant. The elements of one such possible arrangement are shown in FIGS. 1 and 2, and one form of chemical oxidant introduction system is shown in schematic form in FIG. 9. Referring to FIGS. 1 and 2, the additional treatment system includes a perforated distributor tube 102 that extends into and across the liquid flow path, and can advantageously be positioned in reactor vessel inlet conduit 16. Perforated distributor tube 102 extends diametrically within inlet conduit 16 and is adapted to introduce into the water entering reactor vessel 10, at a controlled rate, a suitable chemical oxidant, such as hydrogen peroxide or the like.

Referring once again to FIG. 9, a suitable storage tank 104 contains the hydrogen peroxide or other chemical oxidant. A shutoff valve 106 is provided in an oxidant supply line 108 to shut off the flow of the oxidant, such as during a backwash or a cleaning operation. A flow measurement device, such as a rotameter 110, is provided in oxidant supply line 108 for a visual indication of the flow rate of the oxidant. The flow of the oxidant through oxidant supply line 108 is controlled by means of a flow control valve 112, downstream of which is a check valve 114 to prevent backflow of water into oxidant supply line 108. Water for diluting the oxidant is furnished by means of a pump 116 having a suction line 118 connected to reactor outlet conduit 18 to provide a source of treated water. The treated water and oxidant are conveyed to a venturi injector 120 to be mixed together, after which the oxidant-water mixture passes through an isolation valve and into perforated distributor tube 102, and then into the water stream as it enters the reactor vessel. The flow of dilution water should be at a rate that is adequate to disperse the chemical oxidant across the full cross-sectional area of inlet area of reactor vessel 10 effective mixing with the incoming water that is to be treated.

In addition to its use for introducing a chemical oxidant for additional disinfection, the chemical oxidant introduction system disclosed can also be utilized to chemically clean the outer surfaces of the quartz sleeves within which the ultraviolet lamps are carried. In that case a suitable cleaning concentrate can be provided in storage tank 104 instead of hydrogen peroxide. A quartz sleeve cleaning operation can be initiated manually or automatically before the start of a filter run, or at pre-set time intervals by using a suitable programmable logic controller.

The level of light output from the ultraviolet lamps that is transmitted through the quartz sleeves can be monitored by an ultraviolet light monitor. One form of available monitor utilizes one or more photocells, which have a tendency to drift and should therefore be recalibrated at regular intervals against an actinometer.

Another form of ultraviolet light monitoring arrangement can include a chemical actinometry system having an ultraviolet light sensing device positioned within reactor vessel 10. In such a system, actinometry reagents, such as a potassium iodide/iodate solution, can be fed into the reactor vessel at a predetermined flow rate and at predetermined time intervals for exposure of the actinometry reagent to the ultraviolet light to which the water being treated is subjected. When the actinometry system reveals that there has been a predetermined decline in the level of the ultraviolet light within the reactor, a suitable output signal can be provided by the actinometry system to indicate the need for cleaning of the quartz support tubes, or for replacement of the ultraviolet lamps; in order to maintain the desired level of operating efficiency of the disinfection process. Additionally, the actinometry system output signal can be supplied to a variable power level control associated with the ultraviolet lamps to increase the power supplied to the lamps so that the ultraviolet light output of the lamps is increased to offset the output decline caused by the perceived decline in light output.

Additional control of the operation of the ultraviolet lamps can be provided by a variable output electronic control. By the use of such a device an operator can manually increase the power to the ultraviolet lamps over time, as the lamp output degrades, in order to maintain the desired ultraviolet disinfection level. Such manual adjustments can be based upon the ultraviolet light output measurements provided by an actinometry system, which permits more precise and more uniform control over the operation of the system.

By providing a suitable programmable logic controller, the operation of the disinfection reactor in accordance with the present invention can be integrated with a filtration plant operating system. Such an integrated arrangement can provide operating information such as ultraviolet lamp status, operating hours, flow rate, actinometry system status, and pump status for a chemical oxidant system, if the latter is utilized. Additionally, as will be appreciated by those skilled in the art, the present system is such that it can be readily and easily integrated into an existing water treatment system, because of the relatively compact nature of the reactor vessel by virtue of the transverse arrangement of the ultraviolet lamps, as compared with prior art systems in which the lamps are generally oriented in a direction parallel to the flow direction, which increases the overall length of the disinfection reactor and renders retrofitting more difficult in limited space situations.

Figure 10:
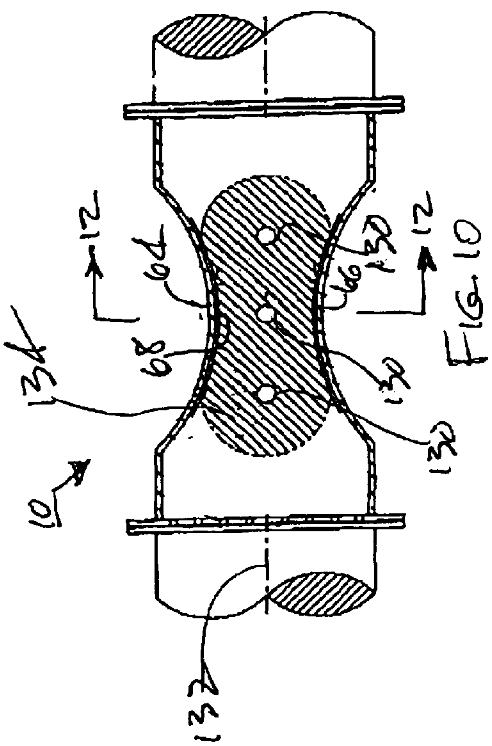
FIG. 10 is a longitudinal cross-sectional view through a reactor vessel in accordance with the present invention showing the irradiation influence zone along the water flow path within the reactor vessel.
Figure 11:
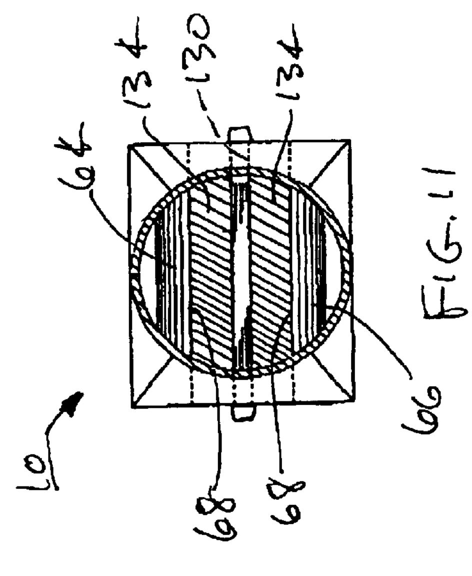
FIG. 11 is a transverse cross-sectional view through a reactor vessel in accordance with the present invention showing the irradiation influence zone across the water flow path within the reactor vessel.
Figure 15:
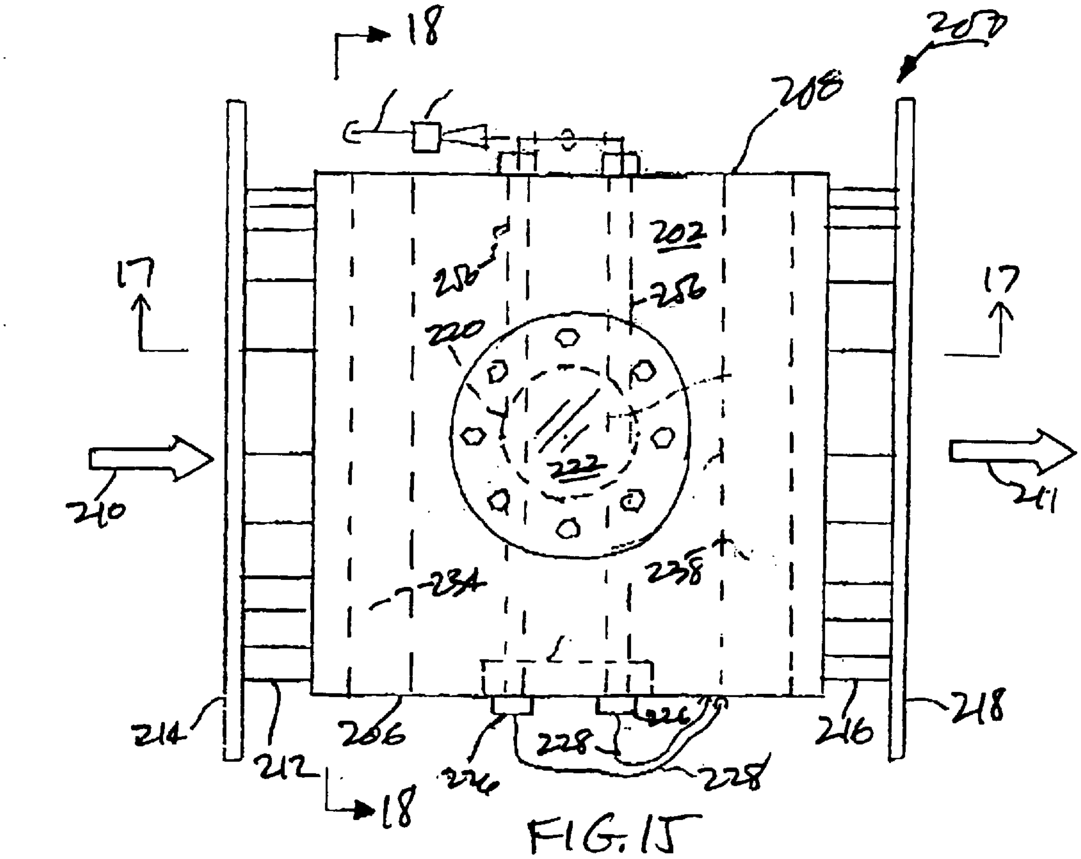
FIG. 15 is a top view of the disinfection reactor shown in FIG. 14.

The benefits of the present invention in effectively and efficiently exposing all the water to be treated to ultraviolet radiation are illustrated in FIGS. 10 and 11. As there shown, reactor vessel 10, which provides a flow passageway that has a rectangular cross section through which the water to be treated flows, includes three ultraviolet lamps 130. The lamps are each oriented to extend substantially perpendicularly to the flow direction, they are spaced from each other along the flow direction, and they have their axes substantially parallel to each other and intersecting the longitudinal axis 132 of the flow channel that is defined within reactor vessel 10.

The sectioned area 134 around the several lamps 130 represents the aggregate effective irradiance influence zone that is provided by the irradiance influence of each of the respective lamps. In that regard, the effective irradiance influence zone around each lamp is a cylindrical volume that has an outer limit that can be defined as that distance from the lamp sleeve at which the irradiance level is at a predetermined level relative to the irradiance level at the lamp sleeve surface. For example, that outer limit can be assumed to be the point at which the irradiance level is equal to some predetermined percentage of the irradiance level at the lamp sleeve surface, for example 1%.

The irradiation influence zones of each of the respective lamps 130 overlap each other to a certain degree. That overlap provides a continuous irradiation zone that extends longitudinally for a certain distance along the flow direction, as shown in FIG. 10, as well as completely across the flow direction, as shown in FIG. 11. In that regard, the spacing between upper guide surface 64 and lower guide surface 66 is selected so that the irradiance zone 134 extends completely to the innermost surfaces of each of guide surfaces 64, 66 for a given distance in the flow direction, so that the entire flow field is exposed over that given distance to the ultraviolet light irradiance influence zone that is defined by area 134.

Figure 12:
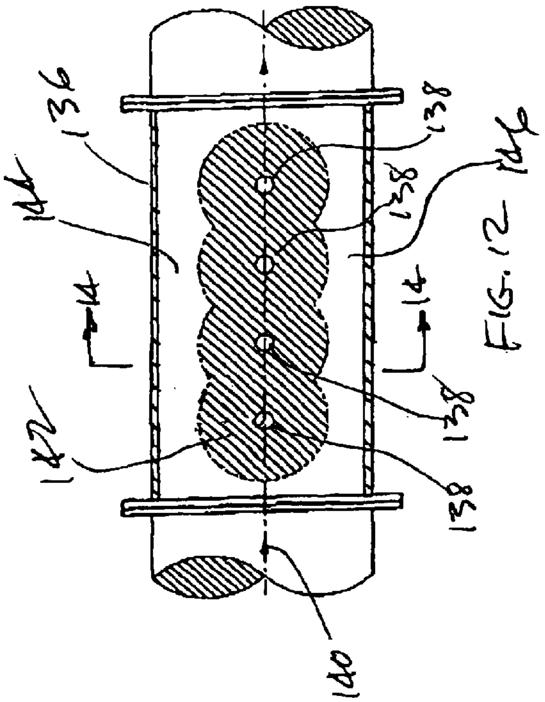
FIG. 12 is a longitudinal cross-sectional view through a tubular reactor vessel showing the irradiation influence zone along the water flow path within the reactor vessel.
Figure 13:
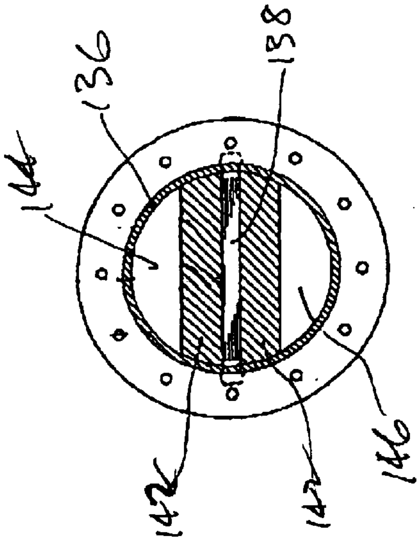
FIG. 13 is a transverse cross-sectional view through a tubular reactor vessel showing the irradiation influence zone across the water flow path within the reactor vessel.

In contrast with the flow field exposure provided by a reactor vessel in accordance with the present invention as shown in FIGS. 10 and 11, the flow field exposure for transversely-positioned lamps within a tubular flow conduit is shown in FIGS. 12 and 13. Tubular flow conduit 136 includes several ultraviolet lamps 138 that extend transversely relative to the longitudinal axis 140.

The aggregate irradiation influence zone defined by each of lamps 138 is represented by sectioned area 142. But although irradiation influence zone 142 extends completely across flow conduit 136, along the axes of lamps 138, as shown in FIG. 13, there remain irradiance dead zones 144, 146, above and below lamps 138, respectively, that result from the circular cross section of the flow channel and the cylindrical form of the transversely oriented irradiance zones. Irradiance dead zones 144 and 146 are zones within which substantially no ultraviolet radiation at an effective level penetrates the entire water flow field. Thus, the disinfection treatment efficiency of the arrangement shown in FIGS. 12 and 13, in which the effective irradiation influence zone terminates at a point that is spaced from the inner wall surface of conduit 136, is less than that of the arrangement shown in FIGS. 10 and 11, in which the effective irradiation influence zone extends completely to the inner surfaces of each of upper and lower guide surfaces 64, 66, respectively, of reactor vessel 10, thereby exposing the entire flow field to an effective level of ultraviolet radiation.

Another embodiment of a disinfection reactor structure is shown in FIGS. 14 through 21. Reactor 200, as shown, is in the form of a square box that includes a top wall 202, a bottom wall 204, and a pair of sidewalls 206, 208. Walls 202 through 208 together define a substantially square reactor transverse cross section when viewed in a transverse direction, relative to the water flow direction indicated by arrow 210, and also a square cross section when viewed in a longitudinal cross section, relative to the direction of water flow. Although illustrated and described as a substantially square cross section reactor, reactor 200 can also be configured to have a rectangular cross section, wherein all of the opposed walls are not necessarily the same size.

Reactor 200 includes a tubular inlet section 212 having an inlet end flange 214 for connection with an upstream end of the associated water pipe (not shown), and a tubular outlet section 216 having an outlet end flange 218 for connection with the downstream end of the associated water pipe (not shown). Flow enters reactor 200 in the direction of inflow arrow 210 and exits from reactor 200 in the direction of outflow arrow 211. A tubular viewing port 220 defining an access opening and including a viewing port window 222 is provided in top wall 202 to allow physical as well as visual access to the interior of reactor 200.

Within reactor 200 and extending between sidewalls 206, 208 and transversely across the water flow direction are four tubular ultraviolet lamps 224 (see FIG. 18) that are enclosed within respective protective quartz sleeves that are also of tubular form. Lamps 224 and their associated quartz outer sleeves are supported at their ends by respective lamp end supports 226 that are carried by reactor sidewalls 206, 208. Power conduits 228 connect lamps 224 with a suitable source of electrical power (not shown). Further references herein to the ultraviolet lamps should be understood to include a lamp and its associated outer protective quartz sleeve.

Figure 14:
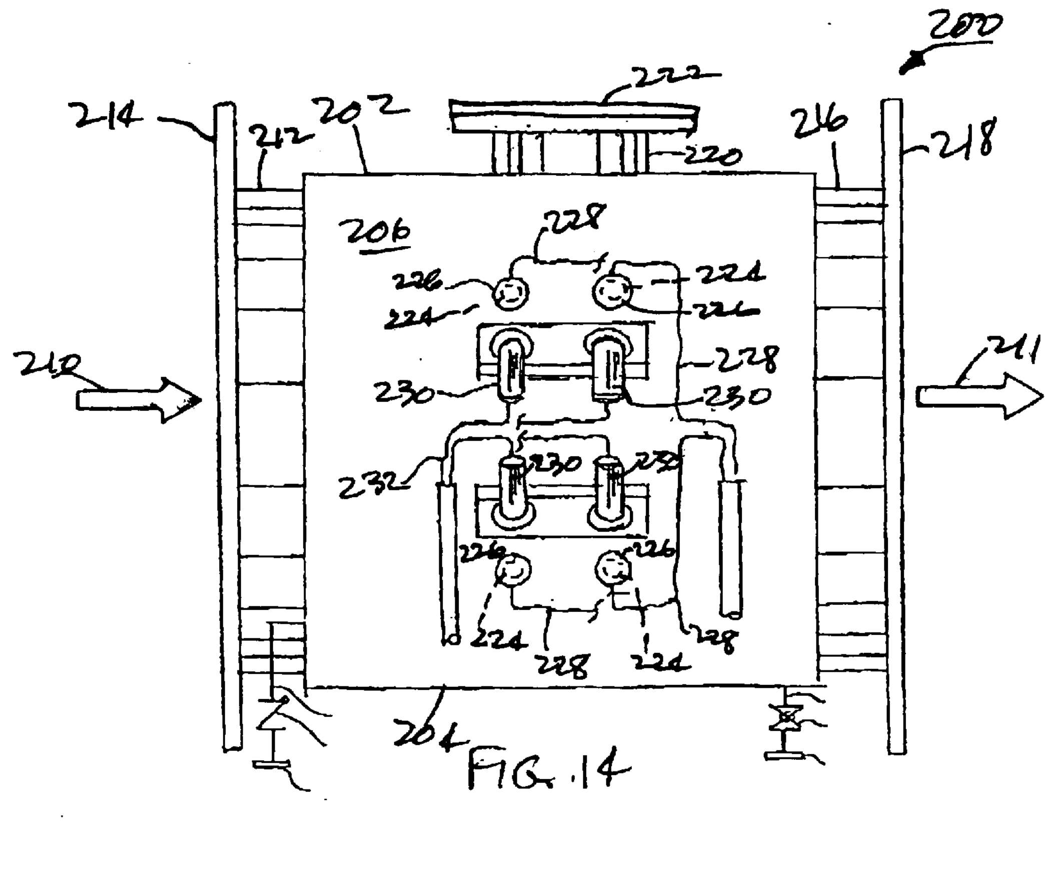
FIG. 14 is a right side view of another embodiment of an ultraviolet-light-based disinfection reactor.
Figure 18:
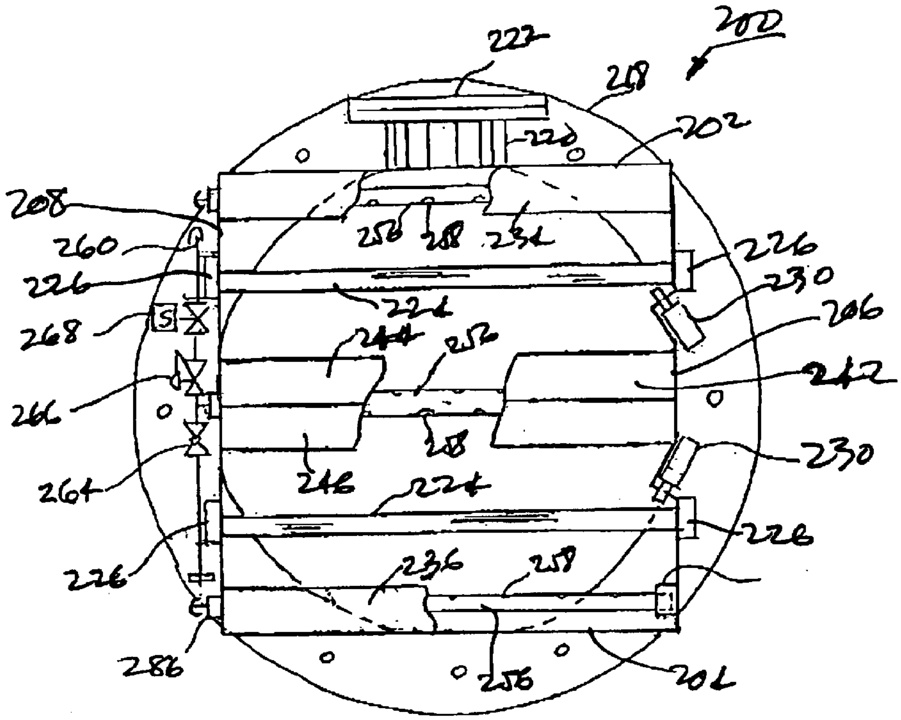
FIG. 18 is a cross-sectional view of the disinfection reactor taken along the line 18—18 of FIG. 15.

Also supported by reactor sidewalls 206, 208, as shown in FIGS. 14 and 18, are respective ultraviolet light sensors 230, each sensor positioned adjacent to and associated with a respective ultraviolet lamp 224. Sensors 230 can be in the form of photocells and serve the purpose of monitoring the ultraviolet light intensity levels of the lamps, to conform with various international industrial standards (such as Austrian ONORM, German DVGW, etc.) for monitoring the ultraviolet disinfection provided by medium pressure ultraviolet lamps. The signals provided by the respective sensors are transmitted by conduits 232 to a programmable logic controller for automatic control of the lamp input power and of the cleaning system of the reactor.

As shown in FIG. 14 and in the cross-sectional view of FIG. 18, two pairs of lamps 224 are positioned so that the axes of the lamps are parallel to each other, and the lamps of each pair are spaced from each other in the flow direction. Upper lamps 224 are adjacent to and spaced from top wall 202 a distance of about one-fourth the height of reactor 200. Similarly, lower lamps 224 are adjacent to and spaced from bottom wall 204, and are positioned so that the axes of the lamps are parallel to each other, and the lamps are spaced from each other in the flow direction. Lower lamps 224 are spaced from bottom wall 204 a distance of about one-fourth the height of reactor 200. The axes of each of lamps 224 are substantially parallel to each other and lamps 224 define a substantially square array, as shown in FIG. 14.

Figure 16:
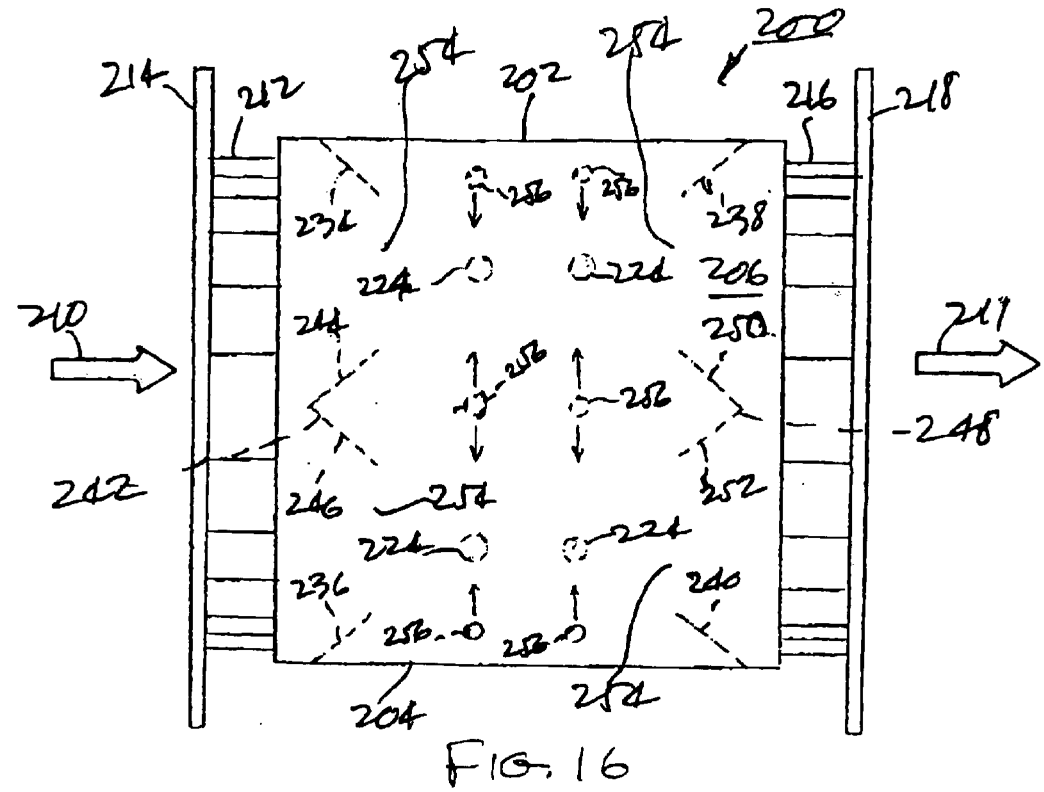
FIG. 16 is a left side view of the disinfection reactor shown in FIG. 14.

Referring to FIGS. 16 and 18, extending inwardly into the interior of reactor 200 from top and bottom walls 202, 204 and at an acute angle relative to those walls are four outer flow deflectors 234, 236, 238, 240 in the form of rectangular plates. Upstream outer flow deflectors 234, 236 are spaced from each other and are inclined in a downstream direction, and downstream outer flow deflectors 238, 240 are spaced from each other and are inclined in an upstream direction.

Positioned substantially equidistantly between upstream outer flow deflectors 234, 236, and extending substantially centrally and transversely across the longitudinal axis of reactor 200, is an upstream inner flow deflector 242 defined by a pair of generally rectangular, angularly disposed plates 244, 246. Upstream inner flow deflector 242 has a V-shaped cross section with the apex of the V pointing in an upstream direction, and with plates 244, 246 defining therebetween an included angle of from about 30° to about 120°.

Similarly, positioned substantially equidistantly between downstream outer flow deflectors 238, 240, and extending substantially centrally and transversely across the longitudinal axis of reactor 200 is a downstream inner flow deflector 248 defined by a pair of generally rectangular, angularly disposed plates 250, 252. Downstream inner flow deflector 248 also has a V-shaped cross section with the apex of the V pointing in a downstream direction, and with plates 250, 252 defining therebetween an included angle of from about 30° to about 120°. Upstream deflector plates 234, 244 and 236, 246, as well as downstream deflector plates 238, 250 and 240, 252 each have component of length in the longitudinal direction such that adjacent outer and inner plates do not meet, but terminate at end points to define a flow gap 254 therebetween. The flow gaps in a given vertical plane can be of the order of from about 50% to about 75% of the spacing between top and bottom walls 202, 204, depending upon the cross-sectional area of the flow channel defined by reactor 200 and the desired water flow rate through the reactor.

The deflector plates serve as liquid guide surfaces to spread the incoming liquid flow across the reactor transverse cross section, and to direct the flow toward lamps 224 for improved ultraviolet light exposure of the liquid to be treated. They also provide rigid structural bracing of reactor sidewalls 206, 208 for high water pressure applications.

Also shown in FIG. 16 are a series of cleaning solution conduits 256 that extend between sidewalls 206, 208 and are spaced from and positioned substantially parallel to lamps 224. The outermost cleaning solution conduits, which are positioned between flow deflectors 234, 238 and 236, 240, have a series of radially-extending, longitudinally spaced apertures 258 (see FIG. 18) that face inwardly of reactor 200 toward an adjacent lamp 224. The innermost cleaning solution conduits 256, which are positioned between inner flow deflectors 242, 248, have an upper row of radially-extending, longitudinally spaced apertures 258 and a lower row of radially-extending, longitudinally spaced apertures 258. Upper apertures 258 face upper lamps 224, and lower apertures 258 face lower lamps 224. Together, outermost and innermost cleaning solution conduits 256 are positioned so that a suitable cleaning solution that is fed to the respective conduits will issue toward the outer surfaces of respective adjacent lamp sleeves for removal of scale and debris that collects on the outer surfaces of the sleeves and that serves to diminish the light output therethrough.

Figure 17:
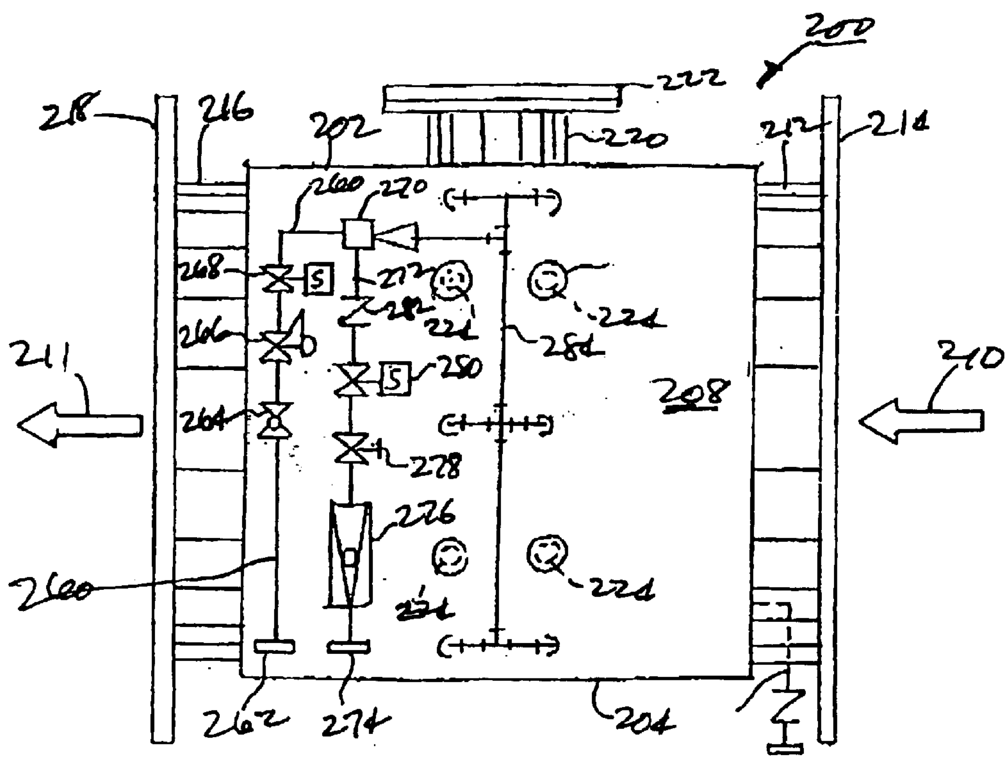
FIG. 17 is a cross-sectional view of the disinfection reactor taken along the line 17—17 of FIG. 15.

The cleaning solution system is supported on sidewall 208 and is shown in greater detail in FIG. 17. A conduit 260 having an end connection 262 is connected with a source of clean water (not shown). Conduit 260 includes a clean water ball valve 264 for shutting off clean water flow. Downstream of ball valve 264 is a pressure-regulating valve 266, followed by solenoid-controlled flow control valve 268 that is connected with a venturi injector 270. Also connected with venturi injector 270 is a cleaning solution conduit 272 that terminates at an end connection 274 for connection with a source of cleaning solution (not shown). The cleaning solution flows through a flowmeter 276, which can be a rotameter, through a needle valve 278, a solenoid-operated flow control valve 280, and a ball check valve 282 to enter venturi injector 270 and to mix therewithin with clean water to provide a solution having the desired concentration of cleaning material. Venturi injector 270 has an outlet that is connected by a conduit with a manifold pipe 284 from which respective branches extend to respective cleaning solution conduits 256.

Figure 19:
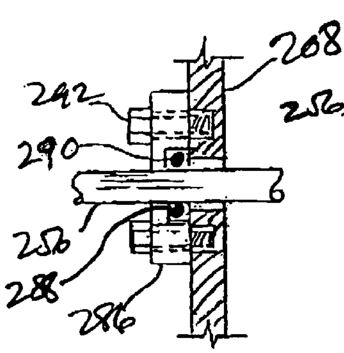
FIG. 19 is a fragmentary cross-sectional view of an end support structure for an end of a cleaning solution pipe.
Figure 20:
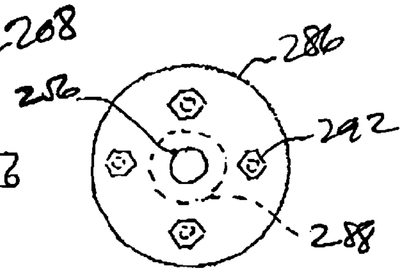
FIG. 20 is an end view of the support shown in FIG. 19.
Figure 21:
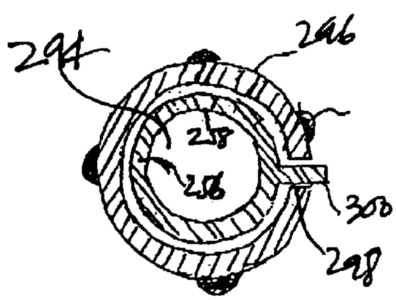
FIG. 21 is a cross-sectional view of an end support structure for another end of a cleaning solution pipe.

FIGS. 19 through 21 show exemplary support arrangements for supporting cleaning solution conduits 256 at the sidewalls of the reactor. The inlet ends of conduits 256 are supported as shown in FIGS. 19 and 20, in which an end plate 286 is provided having an opening to receive a conduit 256. The inner surface of end plate 286 includes a circular recess 288 to receive an O-ring 290 to provide a liquid-tight seal. End plate 286 is attached to sidewall 208 by bolts 292 that are received in blind bores provided in sidewall 208. At their opposite ends, as shown in FIG. 21, conduits 256 have a closed end wall 294, and those ends are supported in an annular holder 296 that includes a radially-extending gap 298 to receive a radially-extending projection 300 provided on the end of conduit 256 for orienting the conduit so that apertures 258 face in the desired directions toward a respective lamp sleeve.

The lamp sleeve cleaning system illustrated and described herein results in effective cleaning of lamp sleeve outer surfaces using high-pressure clean water along with suitable chemical additives or entrained air to remove scale and iron deposits. Additionally, the disclosed arrangement allows the lamp sleeves to be cleaned while the reactor is operating, and with no significant adverse impact upon ultraviolet light delivery to the water to be treated. Moreover, the sleeve cleaning system can be utilized during reactor startup to cool the lamp sleeves by feeding cooling water alone through the cleaning conduits to provide jets of cooling water that impinge against the lamp sleeve outer surfaces. The disclosed system also simplifies the cleaning process by eliminating the moving parts, seals, and brushes that are associated with mechanical cleaning systems. The positioning of cleaning solution conduits 256 between the upstream and downstream deflectors, as herein described, does not impede flow through the reactor and increase head loss because the cleaning solution conduits are located in stagnant flow regions between the deflectors.

Figure 22:
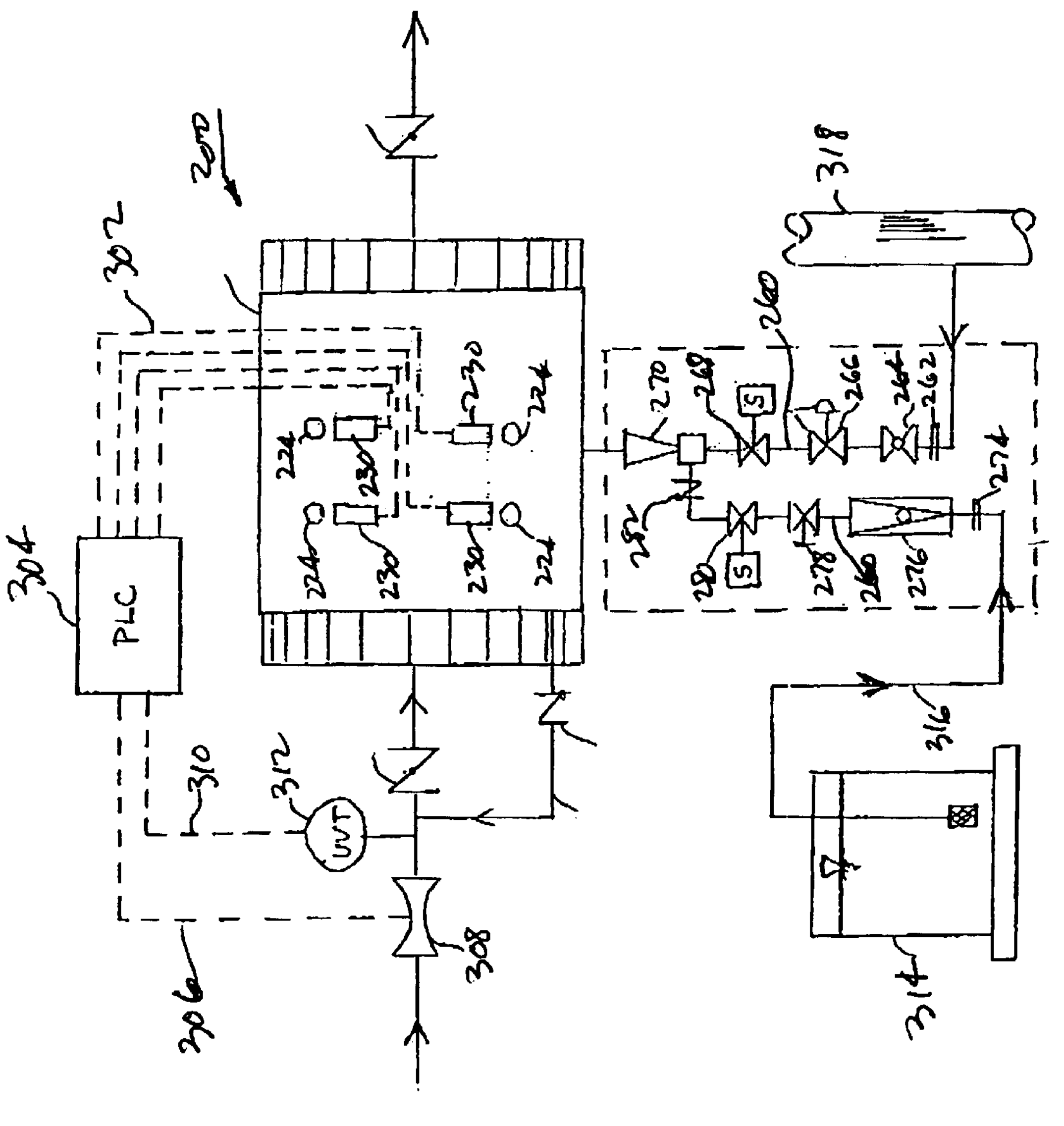
FIG. 22 is a schematic diagram showing the light source controls and the light source cleaning solution system.

FIG. 22 shows the connection arrangements for the lamp intensity monitoring system and for the lamp sleeve cleaning system. Photocell sensors 230 positioned adjacent respective ultraviolet lamps 224 provide output signals indicative of the ultraviolet light levels that emanate from the respective lamps. The light level signals are conducted over lines 302 to a programmable logic controller 304. Also provided to controller 304, along conduit 306 from a feedwater flow meter 308, is a signal indicative of the feedwater flow rate, and a signal along conduit 310 from an ultraviolet transmittance sensor 312 that provides a transmittance signal. The lamp intensity, ultraviolet transmittance, and flow signals are utilized to calculate the delivered ultraviolet light dose for disinfection applications.

In addition to its use for calculating the ultraviolet light dose, when lamp output, as measured by photocells 230, falls below a predetermined level, a suitable signal is provided to the lamp sleeve cleaning system shown in FIG. 22. A cleaning solution tank 314 that contains an appropriate cleaning solution, such as citric acid or a caustic solution, is conducted through conduit 316 into the cleaning solution delivery system. The cleaning solution is mixed in venturi injector 270 with clean water from clean water supply pipe 318 and enters respective cleaning solution conduits 256 for injection toward and against the outer surfaces of the lamp sleeves for removal of external deposits that interfere with efficient light transmission.

Figure 23:
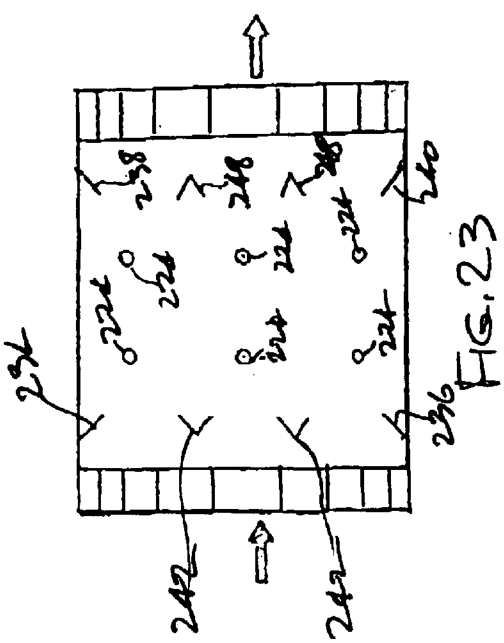
FIG. 23 is a longitudinal cross-sectional view of the interior of another configuration of disinfection reactor.

FIGS. 23 through 26 show longitudinal cross-sectional views of the interiors of additional variations of reactor configurations that could be adopted utilizing the general arrangement of lamps and deflectors as shown in FIGS. 16 and 18. FIG. 23 shows a reactor having non-tapered inlets and outlets with a rectangular array of six parallel lamps 224 that are disposed in two axially-spaced rows of three lamps each. Two sets of inner deflectors 242, 248 are provided, one set positioned between the upper set of lamps and the center set of lamps and the other set positioned between the lower set of lamps and the center set of lamps. This arrangement of lamps and deflectors provides three converging-diverging flow paths and three reduced-area throat sections, enabling the lamp and deflector system to be effectively utilized in a reactor having a larger cross-sectional area than that of the reactor shown in FIG. 16.

Figure 24:
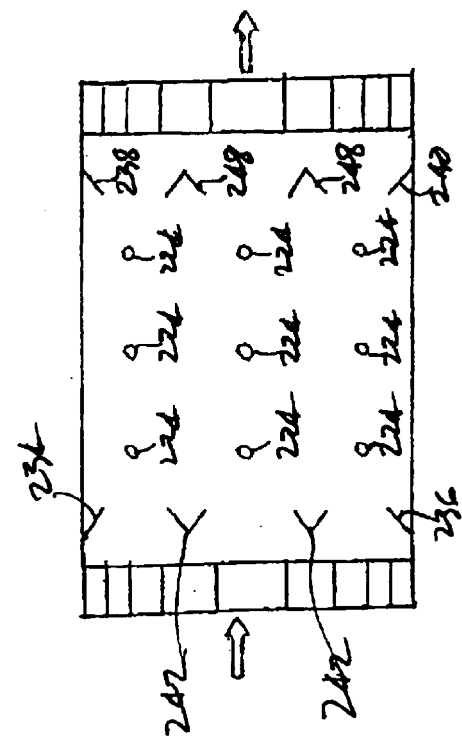
FIG. 24 is a longitudinal cross-sectional view of the interior of a further configuration of disinfection reactor.

FIG. 24 shows another arrangement of lamps and deflectors, similar to that of FIG. 23 except that a nine-lamp array of three axially-spaced groups of three lamps 224 each is provided. By providing an additional group of lamps along the reactor longitudinal axis, the flowing water is exposed to ultraviolet light for a longer time, thereby enhancing disinfection efficiency.

Figure 25:
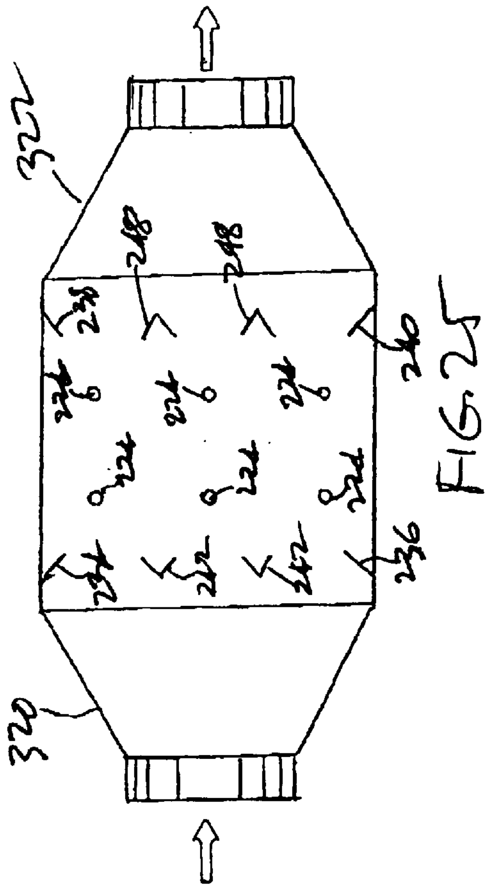
FIG. 25 is a longitudinal cross-sectional view of the interior of a still further configuration of disinfection reactor.

FIG. 25 shows an array of lamps and deflectors similar to that of FIG. 23, but within a reactor having a larger transverse cross-sectional area than that of the water inflow and outflow conduits. Accordingly, a diverging upstream transition section 320 and a converging downstream transition section 322 are provided for connection of the reactor with a flow conduit for water to be treated.

Figure 26:
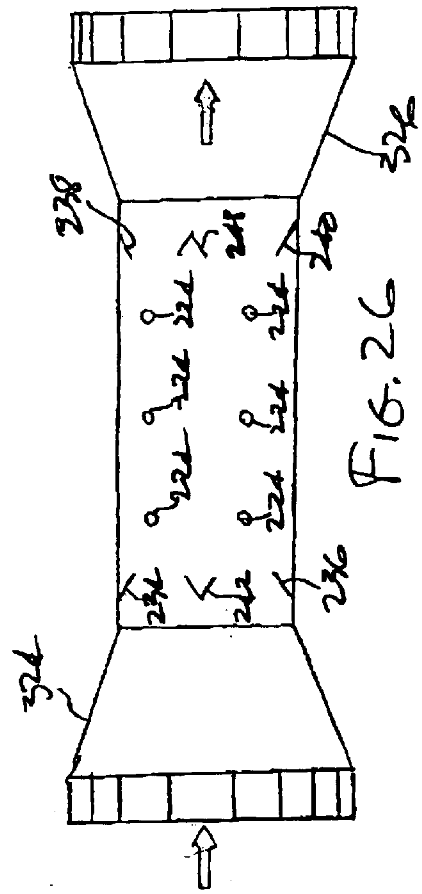
FIG. 26 is a longitudinal cross-sectional view of the interior of another configuration of disinfection reactor.

FIG. 26 shows an array of lamps and deflectors similar to that of FIG. 16, except that a six-lamp array of three axially-spaced groups of two lamps 224 each is provided. As was the case with the arrangement shown in FIG. 24, by providing an additional group of lamps in the flow direction the flowing water is exposed to ultraviolet light for a longer time, thereby enhancing disinfection efficiency. By virtue of the greater axial exposure length, the cross-sectional area of the reactor can be reduced, which requires an converging transition section 324 at the inlet end and a diverging transition section 326 at the outlet end.

The reactors shown and described herein have the ultraviolet lamps extending between the sidewalls of the reactor vessel. As will be apparent, however, orientation of the lamps so that they instead extend between the top and bottom walls of the reactor vessel will provide equivalent results. It should also be noted that the rectangular reactor cross sections for the reactors shown and described herein will accommodate longer standard length ultraviolet lamps than would reactors having a circular cross section, and allow the entire lamp length to be exposed to bulk fluid flow. Thus fewer lamps are required for the same ultraviolet dose than would be required for a circular cross section reactor configuration. Additionally, a rectangular reactor cross section results in longer water exposure times for greater disinfection than that obtained using circular cross section reactors having equivalent cross-sectional areas. And the use of converging and diverging transition sections allows adjustment of lamp number, size, and spacing, as well optimization of the lamp spacing for maximum ultraviolet exposure and minimum head loss.

Finally, for checking the calibration of the photocells employed in the systems herein illustrated and described, one can utilize the chemical-actinometer-based ultraviolet-light-monitoring systems and arrangements disclosed in U.S. Pat. No. 6,595,542, entitled "Flow-Through Chemical Actinometer for Ultraviolet disinfection Reactors," which issued on Jul. 22, 2003, and in copending application Ser. No. 10/154,983, filed on May 24, 2002, and entitled "Actinometric Monitor for Measuring Irradiance in Ultraviolet Light Reactors," each of which names Christopher R. Schulz as the inventor. Further, the entire contents of that patent and of that pending application are hereby incorporated herein by reference to the same extent as if fully rewritten.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. A disinfection reactor for disinfecting a liquid by exposing the liquid to ultraviolet light, said reactor comprising:

a. a reactor vessel defining an enclosure, the reactor vessel including a flow channel and a liquid inlet for receiving liquid to be treated and a liquid outlet through which treated liquid passes;

b. at least two spaced, tubular ultraviolet lamps positioned between the liquid inlet and the liquid outlet and having their respective longitudinal axes positioned substantially transversely relative to the direction of liquid flow through the flow channel;

c. a plurality of liquid guide surfaces positioned within the reactor vessel for guiding liquid to flaw over the at least two ultraviolet lamps for exposure of the liquid to ultraviolet light, wherein the guide surfaces define at least one converging flow section upstream of the ultraviolet lamps, and wherein liquid flowing through the reactor vessel traverses a converging flow pathway providing a reduced cross-sectional area flow pathway adjacent to the ultraviolet lamps for enhancing disinfection efficiency.

2. A disinfection reactor in accordance with claim 1, wherein the liquid guide surfaces are defined by a pair of opposed surfaces carried within the reactor vessel, the opposed surfaces spaced from each other to define a flow channel therebetween that is in communication with the liquid inlet and the liquid outlet, wherein the flow channel includes a reduced-area throat section.

3. A disinfection reactor in accordance with claim 2, wherein at least one of the lamps is disposed upstream of the reduced-area throat section and at least one of the lamps is disposed downstream of the reduced-area throat section so that liquid flowing through the flow channel passes over and around each of the ultraviolet lamps to disinfect liquid flowing through the flow channel.

4. A disinfection reactor in accordance with claim 3, wherein the at least two lamps have respective longitudinal axes that extend substantially perpendicularly to the direction of liquid flow through the reactor vessel.

5. A disinfection reactor in accordance with claim 2, wherein the reactor vessel includes at least three tubular ultraviolet lamps, one of which is positioned at the reduced-area throat section.

6. A disinfection reactor in accordance with claim 2, wherein the flow channel has a rectangular cross suction between the opposed liquid guide surfaces.

7. A disinfection reactor in accordance with claim 2, wherein the opposed liquid guide surfaces are convexly curved.

8. A disinfection reactor in accordance with claim 2, wherein the flow channel has a substantially rectangular cross section.

9. A disinfection reactor in accordance with claim 2, including an inlet flow baffle member positioned upstream of the reduced-area throat section.

10. A disinfection reactor in accordance with claim 9, wherein the inlet flow baffle member includes a plurality of apertures that extend through the flow baffle member for substantially uniformly distributing the liquid to be treated across the flow channel.

11. A disinfection reactor in accordance with claim 2, wherein the opposed liquid guide surfaces each have a surface reflectance of at least about 80% on opposed faces thereof that define the flow channel.

12. A disinfection reactor in accordance with claim 11, wherein opposed faces of each of the liquid guide surfaces include an overlying reflector member for reflecting into the flow channel at least a substantial portion of the ultraviolet light that impinges on the opposed faces.

13. A disinfection reactor in accordance with claim 12, wherein the reflector members are polished aluminum sheets.

14. A disinfection reactor in accordance with claim 13, wherein the polished aluminum sheets are removably fastened to the liquid guide surfaces.

15. A disinfection reactor in accordance with claim 1, wherein the liquid guide surfaces each include at least one flow deflector vane for deflecting flowing liquid into the interior of the flow channel.

16. A disinfection reactor in accordance with claim 15, wherein the flow deflector vanes extend transversely across substantially the entire flow channel.

17. A disinfection reactor in accordance with claim 16, wherein the flow deflector vanes are carried, by reflector members that overlie opposed faces of the liquid guide surfaces.

18. A disinfection reactor in accordance with claim 12, wherein the reflector members include an overlying clear polymeric protective coating.

19. A disinfection reactor in accordance with claim 12, wherein the reactor vessel includes an access cover for allowing access to the reflector members.

20. A disinfection reactor in accordance with claim 1 wherein the ultraviolet lamps are medium pressure lamps.

21. A disinfection reactor in accordance with claim 1 including a chemical oxidation agent injection system positioned adjacent the reactor inlet for injecting a chemical oxidant into liquid that enters the reactor vessel.

22. A disinfection reactor in accordance with claim 21, wherein the chemical oxidation agent injection system includes a source of hydrogen peroxide for injection into the liquid for additional disinfection and for additional oxidation of contaminants contained in the liquid.

23. A disinfection reactor in accordance with claim 21, wherein the chemical oxidation injection system includes a perforated distributor member for distributing a chemical oxidant across the flow direction of the liquid to be treated in the reactor vessel.

24. A disinfection reactor in accordance with claim 23, including an inlet flow baffle member positioned upstream of the reactor vessel reduced-area throat section, wherein the distributor member is disposed between the baffle member and the reduced-area throat section.

25. A disinfection reactor in accordance with claim 21, wherein the chemical oxidation agent injection system includes means for injecting into the flow stream a cleaning solution for cleaning surfaces through which ultraviolet light is emitted into the flow channel.

26. A disinfection reactor in accordance with claim 1, including an actinometric sampling system for monitoring ultraviolet light intensity in the flow channel within the reactor vessel.

27. A disinfection reactor in accordance with claim 26, wherein the actinometric sampling system provides an output signal representative of the intensity of ultraviolet light emitted into the liquid within the flow channel, and a variable power level control for increasing electrical power supplied to the ultraviolet lamps in response to the output signal from the actinometric sampling system.

28. A disinfection reactor in accordance with claim 1, including a liquid flow rate measuring device for providing a flow rate signal, and a motor-operated flow control valve positioned within the liquid flow path for controlling the liquid flow rate to a desired flow rate in response to the flow rate signal.

29. A disinfection reactor in accordance with claim 28, wherein the flow rate measuring device includes a first pressure tap at the reduced-area throat section of the flow channel for sensing throat section static pressure, and a second pressure tap spaced from the throat section for sensing a second static pressure to provide a differential pressure to enable determination of the liquid flow rate.

30. A disinfection reactor in accordance with claim 1, wherein the ultraviolet lamps are carried within respective tubular quartz sleeves that are supported at opposed sidewalls of the reactor vessel.

31. A disinfection reactor in accordance with claim 30, including sealing means for sealing the ultraviolet lamps from contact with liquid that flows within the flow channel.

32. A disinfection reactor in accordance with claim 1, wherein the liquid guide surfaces include a plurality of deflector plates that extend across the reactor vessel and that are inclined relative to a reactor vessel longitudinal axis that is substantially aligned with a liquid flow direction through the reactor vessel, wherein the deflector plates define a plurality of spaced flow passageways.

33. A disinfection reactor in accordance with claim 32, wherein the liquid guide surfaces include deflector plates that are connected with and extend inwardly from a pair of opposed reactor vessel walls.

34. A disinfection reactor in accordance with claim 33, including a plurality of inclined inner deflector plates positioned between and spaced from the wall-connected deflector plates.

35. A disinfection reactor in accordance with claim 34, wherein pairs of the inner deflector plates define V-shaped members.

36. A disinfection reactor in accordance with claim 35, wherein the apices of the inner deflector plates point in an upstream direction relative to flow of fluid through the reactor vessel.

37. A disinfection reactor in accordance with claim 35, wherein the inner deflector plates include V-shaped members that point in both upstream and downstream directions relative to flow or fluid through the reactor vessel.

38. A disinfection reactor in accordance with claim 32, including cleaning solution conduits positioned downstream of the deflector plates, relative to the direction of fluid flow through the reactor vessel, wherein the cleaning solution conduits include apertures oriented to direct a cleaning solution toward the ultraviolet lamps.

39. A disinfection reactor in accordance with claim 32, wherein the reactor vessel has a rectangular cross section relative to the direction of fluid flow through the reactor vessel.

40. A disinfection reactor in accordance with claim 32, wherein the ultraviolet lamps are medium pressure lamps.

41. A disinfection reactor in accordance with claim 32, including an actinometric sampling system for monitoring ultraviolet light intensity within the reactor vessel.

42. A disinfection reactor in accordance with claim 41, wherein the actinometric sampling system provides an output signal representative of the intensity of ultraviolet light emitted into liquid within the reactor vessel, and a variable level power control for increasing electrical power supplied to the ultraviolet lamps in response to the output signal from the actinometric sampling system.

43. A disinfection reactor in accordance with claim 32, including a plurality of ultraviolet lamps positioned relative to thin deflector plates so that incoming liquid that is deflected by the deflector plates flows over and around the ultraviolet lamps to expose the liquid within each passageway to ultraviolet light.

44. A disinfection reactor in accordance with claim 43, wherein the deflector plates define a pair of spaced, substantially parallel flow passageways.

45. A disinfection reactor in accordance with claim 44, including a pair of ultraviolet lamps positioned relative to the deflector plates to lie within each of the flow passageways to cause liquid flowing within each passageway to pass successively over and around a pair of ultraviolet lamps.

46. A disinfection reactor in accordance with claim 44, including three ultraviolet lamps positioned relative to the deflector plates to lie within each of the flow passageways to cause liquid flowing within each passageway to pass successively over and around three ultraviolet lamps.

47. A disinfection reactor in accordance with claim 43, wherein the deflector plates define three spaced, substantially parallel flow passageways.

48. A disinfection reactor in accordance with claim 47, including a pair of ultraviolet lamps positioned relative to the deflector plates to lie within each of the flow passageways to cause liquid flowing within each passageway to pass successively over and around a pair of ultraviolet lamps.

49. A disinfection reactor in accordance with claim 47, including three ultraviolet lamps positioned relative to the deflector plates to lie within each of the flow passageways to cause liquid flowing within each passageway to pass successively over and around three ultraviolet lamps.

* * * * *